No. 811,344. PATENTED JAN. 30, 1906.
J. C. WANDS.
LIFTING DEVICE.
APPLICATION FILED OCT. 27, 1905.

Witnesses
a. J. McCauley
Nellie L. Church

Inventor:
John C. Wands,
by Bakewell Cornwall Att'y's.

UNITED STATES PATENT OFFICE.

JOHN C. WANDS, OF ST. LOUIS, MISSOURI.

LIFTING DEVICE.

No. 811,344.　　　　Specification of Letters Patent.　　　　Patented Jan. 30, 1906.

Application filed October 27, 1905. Serial No. 284,748.

*To all whom it may concern:*

Be it known that I, JOHN C. WANDS, a citizen of the United States, residing at St. Louis, Missouri, have invented a certain new and useful Improvement in Lifting Devices, of which the following is a full, clear, and exact description, such as will enable others skilled in the art to which it appertains to make and use the same, reference being had to the accompanying drawings, forming part of this specification, in which—

Figure 1:
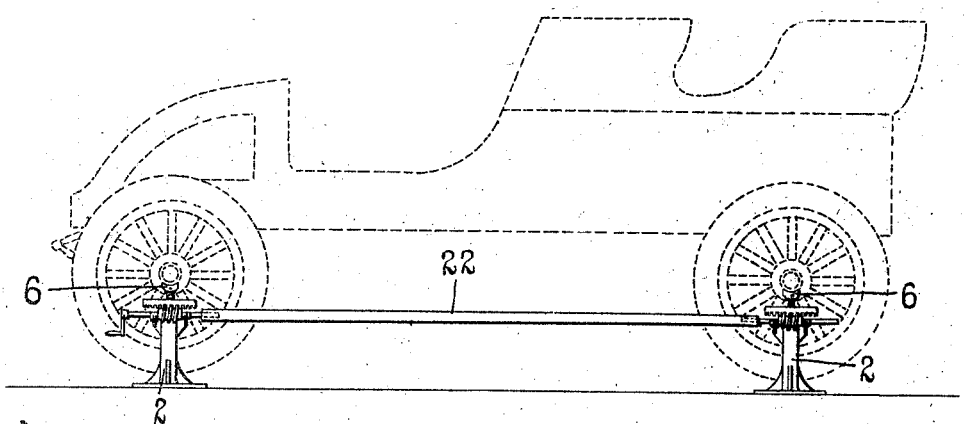
Figure 2:
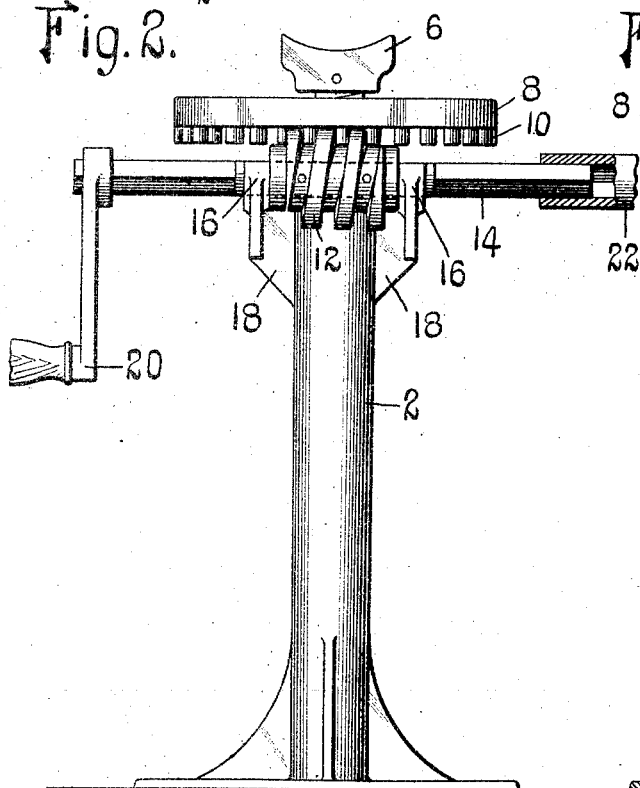
Figure 3:
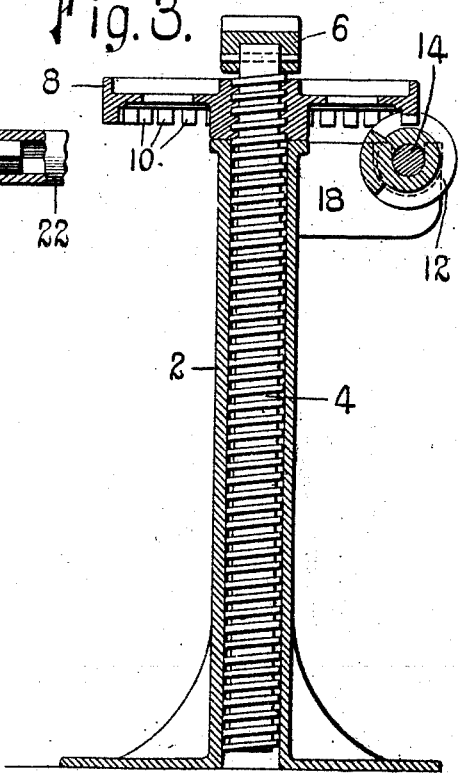

Figure 1 is a side elevation of my improved lifting device in operative position for elevating a vehicle, shown in broken lines. Fig. 2 is an enlarged detail side elevation of the lifting device used for each wheel, and Fig. 3 is a longitudinal sectional view of the device shown in Fig. 2.

This invention relates to devices for raising objects from a supporting-surface, and particularly to devices for raising a vehicle from the bed on which the vehicle rests. The object of my invention is to provide a device of the character described which can be manufactured at a small cost and the parts of which can be easily disassembled.

My invention is herein shown as comprising a device for raising a vehicle—such, for example, as an automobile—from the floor on which the automobile stands to prevent the tires on the wheels of the automobile from being subjected to pressure while the automobile is not in use and also hold the tires out of contact with grease or other substances which would deteriorate the material from which the tires are made. Preferably my improved device comprises means for raising simultaneously both wheels on one side of the vehicle.

Referring to the drawings, which represent the preferred form of my invention, 2 designates a hollow standard having loosely mounted therein a screw 4, having connected to its upper end a bearing-block 6 adapted to engage the hub of one of the front wheels of a vehicle, as shown in Fig. 1. Rotatably mounted on the upper end of said standard is a gear 8, having a screw-threaded portion in engagement with the screw 4, said gear comprising pins 10, which mesh with a worm 12, fastened to a shaft 14, rotatably mounted in open bearings 16 on arms 18, projecting laterally from the standard. The shaft 14 is provided at one end with a handle 20, and its other end is of non-circular shape to fit a connecting-shaft 22. Separated from the standard 2 at a distance equal to that between the front and rear axles of the vehicle is another standard provided with a screw having a bearing-block for engaging the hub of one of the rear wheels of the vehicle and operated by the same kind of mechanism as previously described for operating the bearing-block that engages one of the front wheels of the vehicle, the operating-shaft, which is mounted in this second standard, engaging the other end of the connecting-shaft 22, so that by turning the handle 20 the screw 4 of each lifting device will be actuated for elevating both wheels on one side of the vehicle simultaneously. When it is desired to elevate only one wheel, the connecting-shaft is dispensed with.

From the foregoing description it will be seen that my improved lifting device comprises but few parts and accordingly can be manufactured at a small cost, and as all of the operating parts are mounted loosely upon the standard they can be disassembled easily.

Having thus described my invention, what I claim as new, and desire to secure by Letters Patent, is—

A lifting device comprising a standard, a screw-shaft loosely mounted in said standard and provided at its upper end with a bearing-block adapted to engage a portion of a vehicle, a gear rotatably mounted on the upper end of said standard and having threads which engage the threads of the screw-shaft, the teeth on said gear comprising a plurality of pins, arms carried by said standard and provided with open bearings, a shaft mounted in said bearings and having a worm connected thereto which engages the teeth on said gear, and a device on said shaft by which it may be rotated for causing the screw-shaft to elevate the vehicle; substantially as described.

In testimony whereof I hereunto affix my signature, in the presence of two witnesses, this 24th day of October, 1905.

JOHN C. WANDS.

Witnesses:
WELLS L. CHURCH,
GEORGE BAKEWELL.